United States Patent
Persson et al.

(10) Patent No.: US 10,719,632 B2
(45) Date of Patent: *Jul. 21, 2020

(54) DATA PROCESSING SYSTEMS

(71) Applicant: ARM Limited, Cambridge (GB)

(72) Inventors: Håkan Lars-Göran Persson, Bjärred (SE); Steven John Price, Cambridge (GB); Thomas James Cooksey, Cambridge (GB)

(73) Assignee: Arm Limited, Cambridge (GB)

( * ) Notice: Subject to any disclaimer, the term of this patent is extended or adjusted under 35 U.S.C. 154(b) by 82 days.

This patent is subject to a terminal disclaimer.

(21) Appl. No.: 15/246,949

(22) Filed: Aug. 25, 2016

(65) Prior Publication Data

US 2017/0060637 A1    Mar. 2, 2017

(30) Foreign Application Priority Data

Aug. 26, 2015 (GB) .................................. 1515156.6

(51) Int. Cl.
*G06F 21/74* (2013.01)
*G06F 21/75* (2013.01)
(Continued)

(52) U.S. Cl.
CPC .......... *G06F 21/74* (2013.01); *C09B 67/0097* (2013.01); *C09D 11/50* (2013.01);
(Continued)

(58) Field of Classification Search
CPC ........ G06F 21/556; G06F 21/50; G06F 21/52; G06F 21/55; G06F 21/60; G06F 21/70; G06F 21/71; G06F 21/75; G06F 21/755; G06F 9/48; H04L 9/00; H04L 9/002; H04L 9/003; H04L 9/004; H04L 9/005; H04L 9/06; H04L 9/0637
See application file for complete search history.

(56) References Cited

U.S. PATENT DOCUMENTS 6,510,518 B1 * 1/2003 Jaffe ..................... G06F 21/602
                                                                    713/168
7,404,089 B1 * 7/2008 Campagna .............. G06F 7/723
                                                                    380/30
(Continued)

OTHER PUBLICATIONS

Combined Search and Examination Report dated Mar. 4, 2016, UK Patent Application No. GB1515156.6.
(Continued)

*Primary Examiner* — Charles M Swift
(74) *Attorney, Agent, or Firm* — Vierra Magen Marcus LLP

(57) ABSTRACT

A data processing system includes a host processor that executes an operating system and an accelerator operable to process data under the control of the operating system executing on the host processor. The accelerator can be switched between a normal mode of operation and a protected mode of operation in which the side channel information that can be provided by the accelerator to the host processor is restricted. The data processing system also includes a mechanism for switching the accelerator from its normal mode of operation to the protected mode of operation, and from its protected mode of operation to the normal mode of operation.

19 Claims, 5 Drawing Sheets

(51) Int. Cl.

| | | |
|---|---|---|
| *G06F 21/70* | (2013.01) | |
| *G06F 21/71* | (2013.01) | |
| *H04L 9/00* | (2006.01) | |
| *G06F 9/48* | (2006.01) | |
| *G06F 9/50* | (2006.01) | |
| *C09D 11/50* | (2014.01) | |
| *C09B 67/02* | (2006.01) | |
| *G06F 21/14* | (2013.01) | |
| *G06F 21/12* | (2013.01) | |
| *G06F 21/55* | (2013.01) | |
| *G06F 21/50* | (2013.01) | |
| *G06F 21/60* | (2013.01) | |
| *G06F 12/14* | (2006.01) | |
| *H04L 9/06* | (2006.01) | |
| *G06F 9/46* | (2006.01) | |
| *G06T 1/20* | (2006.01) | |

(52) U.S. Cl.
CPC ............... *G06F 9/468* (2013.01); *G06F 9/48* (2013.01); *G06F 9/50* (2013.01); *G06F 9/5016* (2013.01); *G06F 12/14* (2013.01); *G06F 21/12* (2013.01); *G06F 21/14* (2013.01); *G06F 21/50* (2013.01); *G06F 21/55* (2013.01); *G06F 21/556* (2013.01); *G06F 21/60* (2013.01); *G06F 21/70* (2013.01); *G06F 21/71* (2013.01); *G06F 21/75* (2013.01); *G06T 1/20* (2013.01); *H04L 9/00* (2013.01); *H04L 9/002* (2013.01); *H04L 9/003* (2013.01); *H04L 9/004* (2013.01); *H04L 9/005* (2013.01); *H04L 9/0637* (2013.01); *G06T 2200/28* (2013.01)

(56) References Cited

U.S. PATENT DOCUMENTS

| | | | | |
|---|---|---|---|---|
| 8,909,967 | B1* | 12/2014 | van Dijk | G06F 12/1408 |
| | | | | 713/150 |
| 9,405,708 | B1* | 8/2016 | Pohlack | G06F 21/54 |
| 9,436,603 | B1* | 9/2016 | Pohlack | G06F 21/556 |
| 9,672,162 | B2* | 6/2017 | Persson | G06F 12/1458 |
| 2009/0067617 | A1* | 3/2009 | Trichina | G06F 7/723 |
| | | | | 380/28 |
| 2011/0022852 | A1* | 1/2011 | Sato | H04L 9/003 |
| | | | | 713/189 |
| 2011/0060924 | A1* | 3/2011 | Khodorkovsky | G06F 1/3203 |
| | | | | 713/300 |
| 2012/0331309 | A1* | 12/2012 | Scott | G06F 21/755 |
| | | | | 713/194 |
| 2013/0073873 | A1* | 3/2013 | Morioka | H04L 9/003 |
| | | | | 713/193 |
| 2013/0111204 | A1* | 5/2013 | Gunnam | G06F 21/755 |
| | | | | 713/150 |
| 2013/0301826 | A1* | 11/2013 | Gueron | H04L 9/002 |
| | | | | 380/28 |
| 2013/0318607 | A1* | 11/2013 | Reed | G06F 11/3062 |
| | | | | 726/23 |
| 2014/0053003 | A1* | 2/2014 | Moyer | G06F 21/755 |
| | | | | 713/300 |
| 2014/0095883 | A1* | 4/2014 | Kirillov | H04L 9/3281 |
| | | | | 713/176 |
| 2014/0189862 | A1* | 7/2014 | Kruglick | G06F 21/55 |
| | | | | 726/22 |
| 2014/0237609 | A1 | 8/2014 | Sharp | |
| 2015/0052325 | A1 | 2/2015 | Persson | |
| 2015/0222421 | A1* | 8/2015 | Guo | H04L 9/003 |
| | | | | 380/28 |
| 2015/0222423 | A1* | 8/2015 | Pepin | G06F 7/00 |
| | | | | 713/189 |
| 2015/0312027 | A1* | 10/2015 | Kim | H04L 9/002 |
| | | | | 380/28 |
| 2015/0350239 | A1* | 12/2015 | Kruglick | H04L 63/1441 |
| | | | | 726/23 |
| 2016/0072622 | A1* | 3/2016 | Al-Somani | H04L 9/003 |
| | | | | 380/28 |
| 2016/0140340 | A1* | 5/2016 | Walters | G06F 21/556 |
| | | | | 726/22 |
| 2016/0147274 | A1* | 5/2016 | Kumar | G06F 1/324 |
| | | | | 713/322 |
| 2016/0261403 | A1* | 9/2016 | Benoit | H04L 9/003 |
| 2016/0269175 | A1* | 9/2016 | Cammarota | G09C 1/00 |
| 2016/0352509 | A1* | 12/2016 | Wu | G09C 1/00 |
| 2016/0373091 | A1* | 12/2016 | Audley | G06F 21/755 |

OTHER PUBLICATIONS

Side-channel attack, retrieved on Aug. 24, 2016, available at http://en.wikipedia.org/wiki/Side_channel_attack.

Crypto Noobs #2: Side Channel Attacks, Dec. 15, 2013, available at http://www.cryptofails.com/post/70097430253/crypto-noobs-2-side-channel-attacks.

Zhou et al, "Side-Channel Attacks: Ten Years After Its Publication and the Impacts on Cryptographic Module Security Testing," 2005.

Side Channel Attacks, PrivateCore, 2014, available at https://privatecore.com/resources-overview/side-channel-attacks/.

Irazoqui Apecechea et al, "Fine grain Cross-VM Attacks on Xen and VMware are possible!", Cryptology ePrint Archive, Report 2014/248, 2014.

Ristenpart et al, "Hey, You, Get Off of My Cloud: Exploring Information Leakage in Third-Party Compute Clouds", In Proceedings of the 16th ACM conference on Computer and communications security (CCS '09). 2009 ACM, New York, NY, USA, 199-212. DOI: http://dx.doi.org/10.1145/1653662.1653687.

Zhang et al, "Cross-VM Side Channels and Their Use to Extract Private Keys", In Proceedings of the 2012 ACM conference on Computer and communications security (CCS '12). 2012 ACM, New York, NY, USA, 305-316. DOI: http://dx.doi.org/10.1145/2382196.2382230.

Benger et al, ""Ooh Aah . . . Just a Little Bit" : A small amount of side channel can go a long way", In Proceedings of the 16th International Workshop on Cryptographic Hardware and Embedded Systems—CHES 2014—vol. 8731, Lejla Batina and Matthew Robshaw (Eds.), vol. 8731. Springer-Verlag New York, Inc., New York, NY, USA, 75-92. DOI=http://dx.doi.org/10.1007/978-3-662-44709-3_5.

\* cited by examiner

DATA PROCESSING SYSTEMS

BACKGROUND

The technology described herein relates to data processing systems and in particular to a method of and apparatus for the protected processing of protected content by an accelerator, such as a graphics processing unit (GPU) or a video decoder, under the control of a non-trusted (non-secure) operating system (OS).

Many electronic devices, such as mobile phones or tablets, for example, will include both a host processor (CPU) that executes an operating system, such as Android, and one or more accelerators, such as a GPU, that provide hardware support for specific functions. In the case of a mobile phone or tablet, for example, the GPU may be used to generate the user interface that is displayed under the control of the operating system, and to compose the frame that is displayed on the display to the user.

It is becoming increasingly common for content providers to wish to provide (e.g. stream) protected content, such as videos, to electronic devices (and in particular to mobile devices). In order to support this, it is necessary for the electronic devices to be able to ensure the security of the protected content when it is, e.g., being played back to a user via the device.

One way to do this would be to provide a system (e.g. an ARM TrustZone, as described in US-A-2015/0052325) in which an accelerator, such as a graphics processing unit, can operate in both a protected and normal mode. The protected mode can then be used, for example, when processing protected content. Such a system can provide particular memory access restrictions, e.g. to prevent the accelerator from writing data into a memory area accessible by the operating system in a non-secure fashion when the accelerator is operating in its protected mode. This can then help to ensure that the accelerator operation will not cause a risk of leakage of protected data to the operating system.

However, even when memory protection for protected content is provided, the function being executed by the accelerator on behalf of the operating system, e.g. a graphics shader program submitted by a host processor to run on a GPU, may be non-trusted and the parameters being provided to and from the accelerator may be non-trusted.

The Applicants believe therefore that there remains scope for improved mechanisms for the provision of protected content processing on electronic devices.

BRIEF DESCRIPTION OF THE DRAWINGS

A number of embodiments of the technology described herein will now be described by way of example only and with reference to the accompanying drawings, in which.

DETAILED DESCRIPTION

Figure 1:
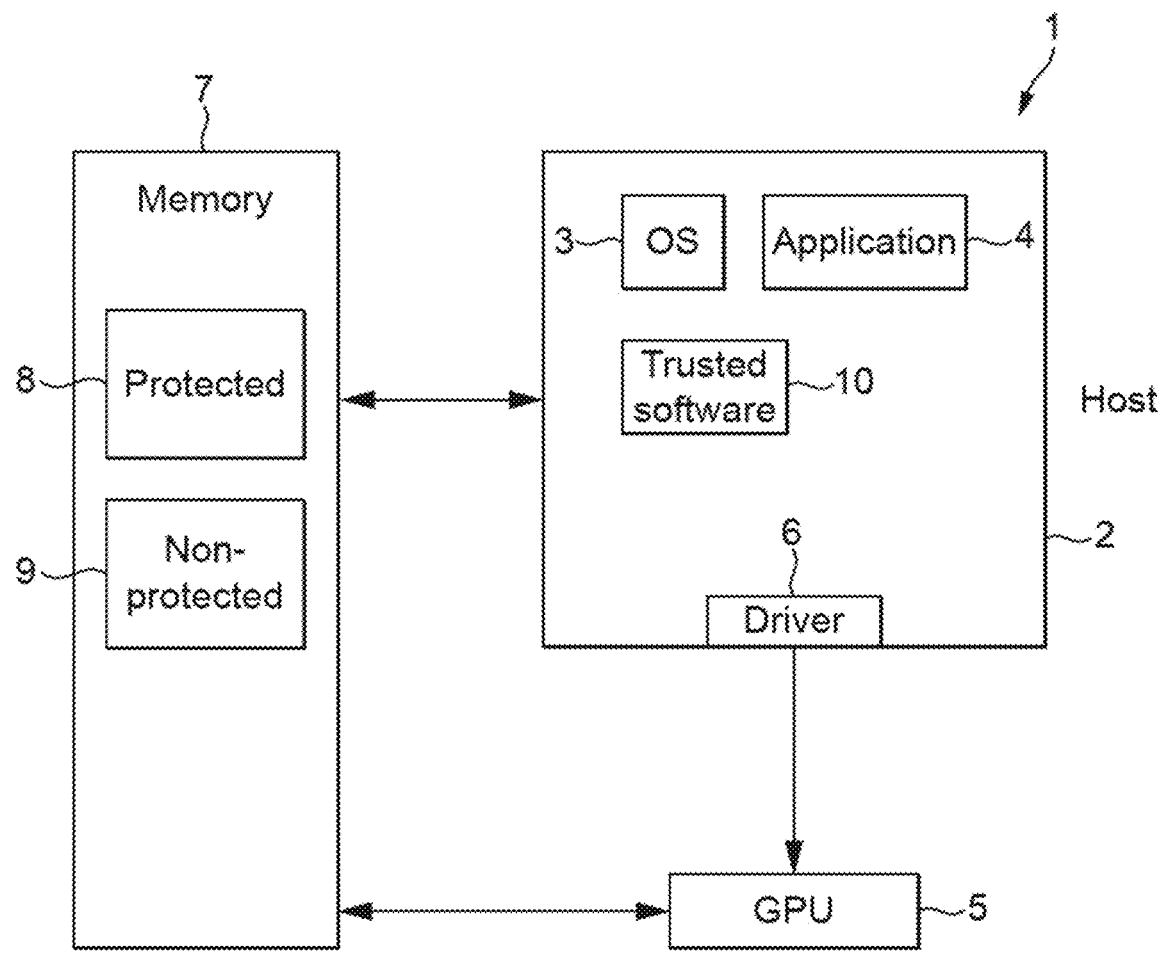
FIG. 1 shows schematically a data processing system that may be operated in the manner of the technology described herein.

One embodiment of the technology described herein comprises a data processing system, the data processing system comprising:
a host processor that executes an operating system; and
an accelerator operable to process data under the control of the operating system executing on the host processor;
wherein:
the accelerator can be switched between a normal mode of operation and a protected mode of operation in which the accelerator is configured to restrict side channel information related to the processing of the data by the accelerator that can be provided by the accelerator to the host processor; and
the data processing system further comprises a mechanism for switching the accelerator from its normal mode of operation to the protected mode of operation, and from its protected mode of operation to the normal mode of operation.

Another embodiment of the technology described herein comprises a method of operating a data processing system that comprises:
a host processor that executes an operating system; and
an accelerator operable to process data under the control of the operating system executing on the host processor;
wherein:
the accelerator can be switched between a normal mode of operation and a protected mode of operation in which the accelerator is configured to restrict side channel information related to the processing of the data by the accelerator that can be provided by the accelerator to the host processor; and
the method comprising:
when it is desired to use the accelerator to perform processing of protected data:
switching the accelerator to its protected mode of operation;
while the accelerator is operating in its protected mode of operation restricting the side channel information that can be provided by the accelerator to the host processor; and
when the accelerator has completed its protected processing task, switching the accelerator back to its normal mode of operation.

The technology described herein comprises a data processing system in which an accelerator, such as a graphics processing unit, can operate in both a protected mode and in a normal mode. The protected mode would be used, for example, when processing protected content.

When in the protected mode, the accelerator restricts the side channel information that is able to be provided (e.g. exposed or sent) to the host processor, e.g. by applying one or more countermeasures, as will be described. This helps to protect the accelerator from, e.g., a side channel attack in which control of the accelerator is compromised and is used, e.g., to control the processing in the protected environment (e.g. under the control of a program submitted by the host processor to the accelerator), when the accelerator is operating in its protected mode, to attempt to cause side channel information to be leaked from the protected environment. Such side channel information could then be used, for example, to aid an attack against the system, e.g. to leak the data being processed by the system which may be protected. However, by restricting the side channel information that is able to be provided by the accelerator, the risk of a side channel attack succeeding, e.g. in leaking protected content, is reduced.

In this way, regardless of the operation the accelerator performs, e.g. when executing non-trusted programs (e.g. shader programs), the transfer of information from its protected world to the operating system can be further reduced, thereby reducing the need to restrict the type of operation the accelerator is allowed to perform on protected content, for example. This reduces the risk of such non-trusted programs, when running on the accelerator and operating on protected data, e.g. in a sandbox, manipulating capabilities intended for the protected data to open up a side channel through which protected data or information relating to the protected data may be leaked. For example, memory management units (MMUs) generally report information, such as memory addresses accessed, the type of access (e.g. read or write), from the accelerator to the host processor when a fault (e.g. illegal access) occurs, etc. A non-trusted program may try to generate MMU faults deliberately with parameters chosen such that information related to the protected data and processing is exposed to the host processor, e.g. outside of the sandbox.

The accelerator may be any suitable accelerator (execution/functional unit) that can, e.g., provide a resource to the host processor (operating system). It could, for example, comprise a graphics processing unit (GPU), an encryption accelerator, a video accelerator, a network (processing) interface, a digital signal processor (DSP), audio hardware, etc. The accelerator can essentially comprise any component that is optimised for a particular task. In an embodiment the accelerator comprises a graphics processing unit.

The data to be processed by the accelerator can be any desired and suitable data (e.g. depending on the nature of the accelerator). In an embodiment, it is content data, e.g. protected content (such as DRM (digital rights management) protected data). The data may, e.g., be video content and/or audio content.

The processing to be performed by the accelerator, e.g. GPU, on the (protected) data may be any desired and suitable such processing, such as, in the case of a GPU, effects processing, overlay generation, display frame composition, etc.

In an embodiment the processing to be performed by the accelerator is controlled by an (e.g. non-trusted) application (e.g. a video player) that requires the output. In an embodiment the application provides programs (e.g. shaders) for the accelerator to execute and parameters (e.g. vertex data and textures) for use by the programs. In an embodiment these programs are thus executed on programmable processing stages of the accelerator, with the programs being executed on input data values to generate a desired set of output data (e.g. appropriately transformed and lit vertex data in the case of a vertex shader) for processing by the rest of the data (e.g. graphics) processing system and/or for output.

In an embodiment the data processing system is in an electronic device, e.g. a portable device, such as a mobile phone, tablet, etc.

The host processor (CPU) should, and in an embodiment does, have (at least) two operating modes, a normal non-secure operating system mode (e.g. Android) and a secure mode where it runs secure (fully trusted) software, such as an ARM TrustZone (or similar) and/or hypervisor software component, outside the non-secure operating system. The secure mode may be used, for example, and as will be discussed further below, to control and configure the restriction of the side channel information.

(It should be noted here that unless the context otherwise requires, references herein to a "secure" mode of operation are intended to refer to operation using fully trusted software, references to a "protected" mode of operation are intended to refer to the particular "protected" mode of operation of the accelerator in the manner of the technology described herein, and references to a "normal" mode of operation are intended to refer to the ordinary operating system operation of the host processor.)

The information that may be provided by the accelerator to the host processor as side channel information may comprise any suitable and desired information relating to the processing of the protected data (and which is not the "main" data that the accelerator is processing and/or to be processed). In an embodiment the side channel information comprises status and/or control information.

The information that may be provided to the host processor as side channel information may comprise any suitable and desired type of information relating to the processing of the protected data in the data processing system. In one embodiment the side channel information comprises one or more of: memory management unit (MMU) fault information, information relating to the status of a task or a group of tasks (such as information for resuming an interrupted task (this may be generated when a task or group of tasks is interrupted to schedule a, e.g. higher priority, task, in order to help restart the interrupted task(s) at the point it was interrupted once it is able to be resumed)), information relating to debugging (e.g. data in debug registers), performance counters, information for communicating between the shader kernel and the host processor (e.g. shader kernel events), accelerator fault addresses and cache timing data (e.g. information relating to the access of memory locations, which may be collected using cache monitoring instructions). In another embodiment the side channel information comprises one or more of: information relating to the completion status of a task or a group of tasks, an exception (e.g. a task exception or an accelerator (e.g. GPU) exception) or an interrupt (e.g. a task interrupt or an accelerator (e.g. GPU) interrupt). In these latter cases (completion status information, exceptions and interrupts) the side channel information may only be available to be provided when a task being executed by the accelerator is terminated (in the cases above the data may be able to be provided while a task is being executed), though this is not always the case.

The information, e.g. of the type described above, which is restricted from being provided as side channel information in the protected mode of operation, may be able to be provided as appropriate in the normal mode of operation by the accelerator to the host processor. This may include status and/or control information, e.g. MMU fault information, performance counters, shader kernel events, etc., provided by the accelerator to the host processor as part of the normal operation of the system.

Thus, in an embodiment, the accelerator is able to, in the normal mode of operation, when processing data under the control of the operating system executing on the host processor, provide information relating to the processing of the data by the accelerator to the host processor. In an embodiment, the information that is able to be provided in the normal mode of operation is not restricted in the way it is in the protected mode of operation, e.g. the restriction on the side channel information that is able to be provided in the protected mode of operation is compared to the corresponding information that is available in the normal mode of operation.

Thus, in an embodiment, in the protected mode of operation the side channel information that can be provided by the accelerator to the host processor is restricted compared to the corresponding information that is available when the accelerator is in the normal mode of operation.

The information that may be provided by the accelerator to the host processor as side channel information may be caused to be provided in any suitable and desired way. In one embodiment, the side channel information is conveyed by the accelerator writing the information to storage, such as a register, from where it can then be read, e.g. by the host processor.

Thus, in one embodiment the data processing system comprises a storage, e.g. the accelerator comprises a storage (though the system may also or instead comprise a storage which is located remote from the accelerator, e.g. on the host processor or elsewhere in the data processing system), and the side channel information may then be written into the storage (i.e. as a way of providing this information, e.g. to be read by another component, such as the host processor). The storage may comprise any suitable or desired storage. In an embodiment the storage comprises one or more registers. In another embodiment the system also or instead comprises a memory. When the storage comprises a memory the side channel information may comprise a queue stored in the memory.

The side channel information could also or instead be conveyed via a communication link, e.g. to signal events, to the host processor. In these embodiments the side channel information is actively transferred from the accelerator to the host processor, e.g. via a defined link, compared to using storage (e.g. register, queue or other memory) into which the side channel information is written and from where it is available to be read.

The accelerator may be configured to restrict the side channel information in the protected mode of operation (e.g. compared to the normal mode of operation) in any suitable and desired way. The restriction could comprise blocking all the side channel information in the protected mode of operation. This may be achieved by not allowing any side channel information to be transferred from the accelerator to the host processor via the side channel (e.g. the one or more communication links), or by preventing the reading and/or writing of any side channel information, e.g. from or to storage (e.g. register, queue or memory).

However, in an embodiment, in the protected mode of operation, the side channel information is restricted by reducing the amount of side channel information that is able to be provided to the host processor (e.g. compared to the amount of side channel information that is able to be provided in the normal mode of operation), e.g. so that a non-zero amount of side channel information may be provided to the host processor. In an embodiment the restriction is imposed by the accelerator when providing the side channel information, rather than by the host processor when reading the side channel information, or by the one or more communication links when transferring the side channel information.

The restriction of the side channel information provided may comprise restricting the rate of data at which the side channel information is able to be provided by the accelerator to the host processor, e.g. transferred via the side channel, in the protected mode of operation (e.g. compared to the rate of data at which the side channel information is able to be provided by the accelerator to the host processor in the normal mode of operation). However, In an embodiment, the restriction of the side channel information provided comprises restricting the size of the individual pieces of side channel information that are able to be provided by the accelerator to the host processor in the protected mode of operation (e.g. compared to the size at which the individual pieces of side channel information are able to be provided by the accelerator to the host processor in the normal mode of operation). In an embodiment the individual pieces of side channel information that are provided by the accelerator to the host processor in the protected mode of operation are restricted to use fewer bits, e.g. to be less than 16 bits, e.g. less than 8 bits, e.g. less than 4 bits, e.g. to a single bit.

In another embodiment the restriction on the side channel information in the protected mode of operation comprises a mask or setting the side channel information to a dummy or default value, e.g. 0 or 1. Using a mask (resulting in the data values appearing as 0 or 1, for example) is particularly convenient for side channel information that is stored in a register, e.g. of the accelerator. Setting the side channel information to a dummy or default value is particularly convenient for data that is stored in a queue.

In another embodiment the restriction on the side channel information in the protected mode of operation comprises preventing the production, writing out and/or reading of the side channel information that may be provided. In this way the side channel information is simply not able to be produced, written out, read (e.g. to or from a register, cache or queue) and/or transferred, and is therefore not able to be provided by the accelerator to the host processor.

In another embodiment the restriction on the side channel information in the protected mode of operation comprises disabling the registers or other storage which hold the side channel information to be provided. In this way the side channel information is simply not able to be written into the storage, e.g. registers, and so is therefore unavailable to be provided to the host processor because there is no side channel information for the host processor to read.

The restriction on the side channel information in the protected mode of operation may be implemented in the form of a sandbox hosted on the accelerator in which protected data is processed. In this way, the data being processed is protected and communication in and out of the sandbox is restricted. Thus arbitrary (non-trusted) software can be executed both inside and outside the (protected) sandbox. However this is safe because communication through, i.e. in and out of, the sandbox is restricted, which helps to prevent an attack (e.g. because this would otherwise open the system up for attack owing to an attacker being able to cooperate with the software in the sandbox).

The restriction applied to the side channel information being provided by the accelerator may depend on the type of side channel information being provided, as will now be described.

Where the side channel information comprises MMU fault information, in an embodiment, in the protected mode of operation the side channel information provided is blocked or restricted to a single bit, e.g. indicating when the fault is from a tiler or from a shader core. This helps to prevent the memory address being obtained by an attacker, as only, e.g., the type of fault is obtainable.

Where the side channel information comprises information relating to the, e.g. completion, status of a task or a group of tasks (e.g. information for resuming an interrupted task), in an embodiment the side channel information to be provided is masked in the protected mode of operation. The masked data could be represented by any suitable and desired set of values but in an embodiment the pieces of information relating to the status of a task or a group of tasks, e.g. the information for resuming an interrupted task, are each set to 0. This helps to prevent an attacker from obtaining information as to how far to accelerator has progressed in executing a chain of tasks. Such information may be provided continuously or when the processing of a task or a group of tasks finishes.

Where the side channel information comprises information relating to debugging, e.g. data in debug registers, in an embodiment the information that may be provided is disabled or masked in the protected mode of operation. The masked information could be represented by any suitable and desired set of values but in an embodiment the data, e.g. in the debug registers, is set to 0. Alternatively one or more of the debug registers could be disabled. This helps to prevent an attacker from obtaining internal state information, e.g. by accessing the memory array of a cache (e.g. directly by executing a memory access as if it had been performed by the system), as such information is not essential for the processing of the protected data.

Where the side channel information comprises performance counters, in an embodiment the writing out and/or sampling of the performance counters is disabled (e.g. in the tile and manual modes) in the protected mode of operation.

When the side channel information comprises information for communicating between the shader kernel and the host processor (e.g. shader kernel events), in an embodiment the production and/or writing out of the information is disabled in the protected mode of operation. This helps to prevent the signalling of events occurring on the accelerator back to the host processor. For example, when the provision of such information is not disabled the accelerator may perform an instruction which results in the sending of an event (e.g. an interrupt) to the host processor, which could provide a parameter (e.g. specifying one out of several such events) relating to the protected data to the host processor.

Where the side channel information comprises cache timing data, in an embodiment transactions (e.g. bus transactions) are prevented from monitoring (e.g. snooping) cache lines in a cache of the accelerator and/or of the host processor in the protected mode of operation. The monitoring of the cache lines may be prevented in the protected mode of operation in any suitable and desired way. In an embodiment the cache lines are prevented from being monitored by disabling cache coherency in the protected mode of operation. (Ordinarily, when another cache, e.g. the host processor's cache, that is coherent with the accelerator's cache were to be monitored, information relating to the transactions being executed by the accelerator may be able to be obtained. Disabling cache coherency helps to prevent such a cache timing analysis attack.)

The cache coherency may be disabled in the protected mode of operation in any suitable and desired way. For example, the sharing of pages in the accelerator's MMU may be disabled, the signalling on the memory interface to the interconnect may be prevented from indicating shared memory for transactions, or the interconnect may request to disable cache coherency with the accelerator, e.g. when the interconnect supports disabling cache coherency dynamically.

Where the side channel information comprises an (e.g. accelerator or task status) exception or interrupt, e.g. a bus error on a buffered write, in an embodiment the storage, e.g. register, to which the exception or interrupt is written is blocked when the accelerator is in the protected mode. This helps to prevent information relating to the exceptions and interrupts being leaked.

The various different restrictions (e.g. as described above depending on the side channel information to be protected) may be enabled in any suitable and desired way, when the accelerator is in the protected mode of operation. The restrictions may be enabled statically, but in an embodiment the restrictions are enabled dynamically, as this enables the restrictions to be implemented individually in a more flexible manner.

In an embodiment the restrictions are enabled by setting a configuration of a trusted register, e.g. with particular register bits representing particular restrictions to be set. In an embodiment the trusted configuration register is only able to be accessed by trusted software (e.g. ARM TrustZone). The trusted configuration register may then be read, e.g. by the accelerator, to determine which of the restrictions to implement when the accelerator is in the protected mode of operation. In an embodiment the restrictions set in the trusted configuration register are automatically implemented when the protected mode is entered. In an embodiment the restrictions set in the trusted configuration register are only applied when the accelerator is in the protected mode of operation, e.g. the restrictions are disabled when the accelerator is switched from its protected mode into its normal mode of operation. This avoids any interaction with the, e.g. trusted, software used for implementing the mechanism to switch the accelerator between its normal and protected modes of operation, and vice versa.

As well as providing protection for the side channel information that may be produced in the data processing system, in an embodiment the system also provides memory access restrictions, e.g. to prevent the accelerator from writing data into a memory area accessible by the operating system in a non-secure fashion when the accelerator is operating in its protected mode. This can then help to ensure that the accelerator operation will not cause a risk of leakage of protected data to the operating system.

Thus, in an embodiment the data processing system further comprises:

a memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode; wherein:

when the accelerator is in the normal mode of operation the accelerator has read and write access to data that is stored in non-protected memory regions but no or write-only access to any protected memory regions; and when the accelerator is in the protected mode of operation the accelerator has read and write access to data that is stored in protected memory regions but only has read-only access to any non-protected memory regions.

In an embodiment the method further comprises:

the accelerator, whilst it is operating in its protected mode of operation, reading data from and writing data to protected regions of the memory, and reading data from, but not writing data to, non-protected regions of the memory.

(It should be noted here that, unlike in more conventional protected or secure operating environments, in these embodiments, the protected mode of operation is arranged such that the protected "world" only has read-only access to the "normal" world, rather than, as would more conventionally be the case, full access to the "normal" world.)

In these embodiments the accelerator has, when operating in its protected mode, read only access to non-protected memory areas and read/write access to protected memory areas, and has, when operating in its normal mode, read/write access to non-protected memory areas, and write only or no access to protected memory areas.

This helps to ensure that protected data is kept outside the operating system when the accelerator is operating in its protected mode and reduces the need, e.g., for safeguards against the operating system trying to execute a malicious accelerator operation in protected mode to discover protected data.

In its normal mode of operation, the accelerator has no read access to protected memory regions (data). It may also have no write access to protected memory regions, but in an embodiment the accelerator is allowed to have write (but only write) access to protected memory regions in its normal operating mode. This will allow, for example, the accelerator to copy data structures required by the accelerator into protected memory when operating in its normal mode.

The restricted memory access when the accelerator is operating in its protected mode can be achieved in any desired and suitable manner.

In one embodiment, bus transaction filtering (a bus transaction filtering mechanism) (bus signalling) is used to provide the memory access restrictions. In an embodiment, an additional signal is included in the relevant bus transaction signalling that indicates when the bus transaction relates to a process that is being carried out in the protected mode or in the normal mode. In an embodiment this signalling is then detected by a firewall between the accelerator and the memory, with the firewall then controlling access to the (data in the) memory accordingly.

Thus in one embodiment, the data processing system includes a firewall between the accelerator and the memory that then controls access to the (data in the) memory accordingly.

The firewall can, e.g., be included in the accelerator, or, e.g., otherwise implemented in the SoC (System-on-Chip), for example in a dynamic memory controller.

In an embodiment the firewall is configured in advance to control the memory access in the desired manner, for example, by means of secure (trusted) host software.

In another embodiment, the memory access restrictions are achieved through use of memory access virtualisation (i.e. by using appropriate memory address virtualisation mapping in a memory management unit (MMU)). In an embodiment two-stage MMU based memory protection is used. (However this is not always necessary. A single stage MMU may be used for content protection, e.g. when the operating system is trusted or with a hypervisor that uses para-virtualisation to merge the stage 1 and stage 2 translation steps into a single page table.)

Where two-stage MMU based memory protection is used, in an embodiment the stage 2 of the MMU for the accelerator is used for the memory access protection. Different stage 2 page tables could be used for the normal and protected mode processing, but in an embodiment, the same MMU stage two page tables are used for both normal mode and protected mode operation, but the interpretation of the page table access permissions is varied depending upon (i.e. depends upon) which mode (normal or protected) the accelerator processing operation is being performed in. Thus, in an embodiment, a different interpretation of the stage 2 page table in the MMU for the accelerator is used depending on the accelerator's operating mode (normal/protected). In an embodiment this is such that memory areas readable in normal mode are not writeable in protected mode. In an embodiment, encoding that is unused (and not readable) in normal mode is used to indicate red/write areas in protected mode.

Thus, in an embodiment, the accelerator has a two stage MMU, with the access permissions for the second stage configured to differ between the normal and protected processing mode.

In an embodiment the memory protection configuration and/or the side channel configuration set in the trusted configuration register is separate to, and not affected by, any resetting of the accelerator. In an embodiment the memory protection configuration and/or the side channel configuration is also robust with respect to power management, e.g., either it is not affected by powerdown, or it is implemented such that no operation is allowed until the memory protection configuration and/or the side channel configuration has been initialised after powerup. (In an embodiment the switch from normal to protected mode does not require clearing the internal state of the accelerator.)

The switching of the accelerator between its normal and protected modes of operation and vice-versa, can be performed in any desired and suitable manner.

In an embodiment the mechanism for switching the accelerator from its normal mode of operation to the protected mode of operation (as well as from its protected mode of operation to the normal mode of operation), in order to protect the side channel information in the protected mode of operation, is also used to switch the accelerator into its protected mode of operation for the memory protection.

The switching of the accelerator between the normal and the protected modes of operation can be configured as desired. This may, and in an embodiment does, depend upon whether the scheduler of the system (which, in an embodiment, the system comprises) that controls the submission of tasks to the accelerator for execution can be trusted with correctly configuring each task that it submits to the accelerator for execution such that protected data doesn't leak, or not.

If the task scheduler can operate in a trusted manner, then normal and protected mode tasks can be (and in an embodiment is) interleaved in a fine-grained way (e.g. on a task-by-task basis (i.e. such that the accelerator may concurrently perform both protected and normal processing (tasks)).

In this embodiment the switching may be done, e.g., on an address space (MMU configuration context) basis (e.g. per application). This may be suitable when virtualisation (MMU) based memory protection is used. In an embodiment, the mode switching is performed using trusted firmware (as will be discussed below).

On the other hand, when the task scheduler cannot be trusted, then an alternative trusted mechanism should be, and in an embodiment is, provided and used for switching the accelerator modes. In this case, in an embodiment, the accelerator may be switched as a whole between the normal and protected modes (i.e. such that the accelerator at any one time is either only doing normal processing or only protected processing). Switching the accelerator as a whole between the normal and the protected modes may also allow the side band information to more easily be protected than in the case where protected and non-protected tasks can be processed simultaneously.

Thus, in one embodiment, the accelerator is switched as a whole between the normal and the protected modes (i.e. the accelerator at any one time is either only doing normal processing or only doing protected processing). This may also be more suitable where bus-transaction memory protection is used and can avoid the need for more complex implementation of security internally in the accelerator.

When the scheduler cannot be trusted with correctly configuring each task such that protected data does not leak, the switching should be, and in an embodiment is, performed using a (different) trusted mechanism. The trusted switching mechanism may be implemented using either trusted software and/or a trusted hardware mechanism. In an embodiment the trusted switching mechanism is implemented by two hardware modes (normal and protected) with a protected software configuration in each hardware mode, e.g. which may be set up earlier by trusted software. In another embodiment the switching mechanism uses trusted software to reconfigure the MMU or a protection firewall when switching between the normal and protected modes of operation.

The task scheduler (which, in an embodiment, the system comprises and is configured to control the submission of tasks to the accelerator for execution) may be implemented in any suitable and desired way, e.g. using software running on the host processor or firmware running on a microcontroller (MCU). The host processor software or MCU firmware may be trusted or non-trusted, as desired and as appropriate.

In an embodiment the switching is carried out by one (or more) of: using trusted firmware to control the switching; using open firmware in conjunction with trusted host software for the switching; fully through trusted software; or using a hardware implemented mechanism (this will be possible where, for example, the accelerator has a hardware internal state clearing mechanism that could be triggered when switching from the protected mode to the normal mode of operation).

The switching of the accelerator from its normal mode of operation into its protected mode of operation may be triggered as a result of a register write, e.g. using trusted or non-trusted software. Alternatively the switching may be triggered as a result of a particular mode selection in the MMU or by reading a command in a memory (e.g. in a buffer or list in the memory) that instructs the accelerator to switch between the normal and protected modes.

When the switching involves trusted host software this can be comprised of any suitable form of trusted host software, such as a trusted virtual machine/hypervisor, ARM TrustZone (or similar), etc.

Where trusted firmware is used to control the switching then, in an embodiment, a (trusted) microcontroller (MCU) is used to schedule the transitions between normal and protected mode processing. This may be implemented as part of the accelerator (sub)system.

An advantage of using trusted firmware to control the switching is that the operating system can simply schedule a protected processing command, and the firmware (e.g. MCU) can then schedule the mode switch to protected mode, execute the protected processing and finally switch back to normal mode without the need for further interaction with the host CPU.

The switching process should, and in an embodiment does, ensure that there is no state (e.g. data, etc.) in the accelerator from the protected mode of operation that remains once the accelerator has been switched back to its normal mode of operation (apart from the settings in the trusted configuration register). This helps to ensure that there can be no leakage of data from the protected world to the normal world. Thus, in an embodiment, the process of switching the accelerator from its protected mode of operation to its normal mode of operation comprises clearing (and triggers the clearing of) any stored data (e.g. any caches, registers, etc., that store data) from the protected operation (apart from the settings in the trusted configuration register).

In an embodiment the accelerator's caches are flushed when a memory area changes from protected to normal status, to avoid protected data remaining in the accelerator's caches being flushed into the memory area after the host processor has erased it. Correspondingly, in an embodiment, a memory area is cleared when it is changed from protected to normal status.

When using this method for protection mode switching, then, in an embodiment, the trusted firmware (e.g. MCU) controls designation of normal or secure transactions on the bus (interconnect), and the MMU stage 2 configuration, and, in an embodiment, the operating system has no direct access to the accelerator's registers, except as required to schedule high level commands to the trusted firmware (e.g. MCU).

Using open firmware in conjunction with trusted host software for the accelerator mode switching facilitates implementing protected processing even when the, e.g. MCU, firmware cannot be trusted. This method can also be used even when the (MCU) firmware is trusted, as it reduces the impact when the (MCU) firmware breaks.

In this arrangement, in an embodiment the operating system submits a request for protected processing to the accelerator, but instead of scheduling it directly the firmware (MCU) asks the trusted host software to perform the switch to protected mode. In this case, in an embodiment the accelerator is switched between the normal and protected mode as a whole, e.g. regardless of the memory access protection being used.

When using the trusted host software method for protection mode switching, in an embodiment the trusted host software controls the designation of normal or protected transactions on the bus (interconnect) and/or the MMU stage 2 configuration, and in an embodiment the trusted host software can block firmware (MCU) and operating system access to GPU registers during protection mode switching.

In the case of using trusted host software on its own (without firmware (a microcontroller)), to perform the switch from normal mode to protected mode (and vice-versa), in an embodiment the operating system submits a request for protected processing directly to the trusted host software, and in an embodiment the accelerator is switched between the normal and protected mode as a whole, e.g. regardless of the memory access protection being used. In an embodiment, the operating system does not try to access the accelerator after asking for a mode change until the change is complete. This may help to avoid bus errors.

When using this method for protection mode switching, in an embodiment the trusted host software controls (and the non-trusted operating system should have no access to) the designation of normal or protected transactions on the bus (interconnect), and/or the MMU stage 2 configuration, and in an embodiment the trusted host software can block the operating system access to accelerator registers during protection mode switching.

In another embodiment, a hardware mechanism is used to control the switching of the accelerator from the normal mode to the protected mode and vice-versa. In this case, in an embodiment there is a hardware mechanism that can be used to set the accelerator in its protected processing mode (and/or in its normal processing mode).

In an embodiment there is then also a hardware mechanism, such as, a hardware-implemented reset, that can clear all state inside the accelerator that can be and is used to clear the accelerator state when switching from protected to normal operating mode (apart from the settings in the trusted configuration register). In this case the switch from protected to normal mode can be controlled from non-trusted software, open firmware or operating system driver, etc. (the software controlling the switch does not have to be trusted).

Such a hardware mechanism (e.g. that clears internal state in the accelerator when switching from protected to normal mode (apart from the settings in the trusted configuration register)) can be implemented as desired. For example, a register that can only be set to indicate protected processing mode could be used to indicate protected processing on the bus, and configured such that changing from protected to normal mode then requires the accelerator to be reset. The accelerator could then be, and in an embodiment is, implemented such that when it is reset all internal state is cleared (apart from the settings in the trusted configuration register).

In an embodiment, the accelerator is signalled as to whether its processing task is to be performed in the protected mode or not, e.g. by a register write. In an embodiment, this is done by the driver for the accelerator providing the indication when it submits the task to the accelerator. The driver, may, e.g., and in an embodiment does, determine whether a task for the accelerator is to be performed in the protected mode or not by tracking whether the memory regions (e.g. buffers) to be used for the task are within the protected "world" (protected memory) or not.

In the arrangements in which trusted firmware is used to control the switching between the normal and protected modes, when virtualisation (MMU) based memory access protection is being used, then the mode switch can be, and in an embodiment is, applied to a single address space. For example in the case of graphics processing, an unprotected vertex or compute task could run in parallel with a protected fragment task as long as they use different address spaces.

If bus-signalling based memory access protection is used, then in an embodiment the mode switch applies to the whole accelerator, and no unprotected tasks are run in parallel to a protected task.

In the case of bus-transaction based memory access protection, in an embodiment the steps taken by the firmware or trusted host software to switch from normal to protected mode comprise one or more of, and in an embodiment all of: ensuring all that unprotected tasks are finished; cleaning and invalidating caches; and configuring the accelerator to issue protected mode transactions on the bus (interconnect).

In the case of bus-transaction based memory access protection, in an embodiment the steps taken by the firmware or trusted host software to switch from protected to normal mode comprise one or more of, and in an embodiment all of: ensuring that all protected tasks are finished; cleaning and invalidating caches; and configuring the accelerator to issue normal mode transactions on the bus (interconnect).

In the case of virtualisation (MMU) based memory access protection, in an embodiment the steps taken by the firmware or trusted host software to switch from normal to protected mode comprise one or more of, and in an embodiment all of: ensuring that any MMU configuration context for a protected task is not being used by any unprotected task; and reconfiguring the stage 2 MMU context for the protected task into the protected mode.

In the case of virtualisation (MMU) based memory access protection, in an embodiment the steps taken by the firmware or trusted host software to switch from protected mode to normal mode comprise one or more of, and in an embodiment all of: ensuring that all protected tasks for the task identifier in question are finished; cleaning the accelerator's caches; and reconfiguring the stage 2 MMU context for normal mode.

In the case of using trusted (MCU) firmware or host processor software to perform the switching, in an embodiment the steps taken to switch from normal to protected mode when using bus-transaction based memory access protection comprise one or more of, and in an embodiment all of: the (MCU) firmware or host processor software ensuring all normal tasks are finished and caches cleaned; the (MCU) firmware or host processor software requesting protection mode switch from the trusted software; the trusted software blocking the firmware (MCU) and/or operating system access to the accelerator registers; the trusted software configuring the accelerator to issue protected memory bus transactions; and the trusted software re-enabling firmware (MCU) and/or operating system access to accelerator registers as required.

Correspondingly, in an embodiment the steps taken to switch from protected to normal mode when using trusted (MCU) firmware or host processor software to perform the switch and using bus transaction based memory access protection, comprise one or more of, and in an embodiment all of: the firmware (MCU) or host processor software ensuring that all protected tasks are finished, and caches are cleaned; the firmware (MCU) or host processor software requesting protection mode switch from the trusted software; the trusted software blocking firmware (MCU) and/or operating system access to the accelerator registers; the trusted host software checking that the accelerator is idle (i.e. that there are no unfinished protected tasks) (this is necessary because the firmware (MCU) and/or host processor software cannot be trusted, and so the trusted host software must double-check that the accelerator has finished its protected processing); the trusted software then invalidating all internal state, including caches, and configuring the accelerator to issue normal bus transactions (to access non-protected memory); and the trusted software re-enabling firmware (MCU) and/or operating system access to accelerator registers as required.

In these arrangements, in an embodiment the steps taken to switch from normal to protected mode when using trusted (MCU) firmware or host processor software to perform the switching, e.g. when using virtualisation based memory access protection, comprise one or more of, and in an embodiment all of: the (MCU) firmware or host processor software ensuring all normal tasks are finished and caches cleaned; the (MCU) firmware or host processor software requesting protection mode switch from the trusted software; the trusted software blocking the firmware (MCU) and/or operating system access to the accelerator registers; the trusted software reconfiguring all stage 2 MMU contexts into protected mode; and the trusted software re-enabling firmware (MCU) and/or operating system access to accelerator registers as required (however, access to the stage 2 MMU configuration registers by the non-secure operating system, and the (untrusted) firmware (MCU) is always blocked).

Correspondingly, in these arrangements, in an embodiment the steps taken to switch from protected to normal mode, when using trusted (MCU) firmware or host processor software to perform the switching, e.g. when using virtualisation-based memory access protection comprise one or more of, and in an embodiment all of: the firmware (MCU) or host processor software ensuring that all protected tasks are finished, and caches are cleaned; the firmware (MCU) or host processor software requesting protection mode switch from the trusted software; the trusted software blocking firmware (MCU) and/or operating system access to the accelerator registers; the trusted host software checking that the accelerator is idle (i.e. that there are no unfinished protected tasks) (this is necessary because the firmware (MCU) cannot be trusted, and so the trusted host software must double-check that the accelerator has finished its protected processing); the trusted software reconfiguring all stage 2 MMU contexts for normal mode; and the trusted software re-enabling firmware (MCU) and/or operating system access to accelerator registers as required (again access to the stage 2 MMU configuration registers by the non-secure operating system, and the (untrusted) firmware (MCU) is always blocked).

In the case of the operating system not trying to access the accelerator after asking for a mode change until the switching is complete, in an embodiment the steps taken to switch from normal to protected mode comprise one or more of, and in an embodiment all of: the (non-trusted) operating system ensuring all normal tasks are finished and caches cleaned; the operating system requesting protection mode switch from the trusted host software; the trusted host software blocking operating system access to the accelerator registers; depending on bus-based or virtualisation based memory access protection, the trusted software either configuring the accelerator to issue protected bus transactions (to access protected memory), or reconfiguring all stage 2 MMU context identifiers for the task into protected mode; and the trusted software then re-enabling operating system access to the accelerator registers as required (again, access to the stage 2 MMU configuration registers by the non-secure operating system is always blocked).

Correspondingly, in an embodiment the steps taken to switch from protected to normal mode comprise one or more of, and in an embodiment all of: the operating system ensuring that all protected tasks are finished, and caches cleaned; the non-trusted operating system requesting normal mode switch from the trusted software; the trusted software blocking operating system access to accelerator registers; the trusted host software checking that the accelerator is idle (i.e. that there are no unfinished protected tasks) (this is necessary because the operating system cannot be trusted, and so the trusted host software must double-check that the accelerator has finished its protected processing); the trusted software invalidating all internal state, including caches; when bus-based based memory protection is used, configuring the accelerator to issue normal bus transactions (to access non-protected memory), or when virtualisation (MMU) based memory access protection is used, reconfiguring all stage 2 MMU configuration context identifiers for normal mode; and the trusted software re-enabling operating system access to registers as required (again, access to the stage 2 MMU configuration registers by the non-secure operating system is always blocked).

If a hardware secured processing mode switch is being used, then the memory protection configuration should be preserved across the GPU reset (thus with virtualisation based memory protection, the MMU stage 2 configuration should be preserved across the GPU reset).

The technology described herein can be implemented in any suitable system, such as a suitably configured microprocessor based system. In an embodiment, the technology described herein is implemented in a computer and/or micro-processor based system.

Although the technology described herein has been described, in some embodiments, in relation to graphics processing (and thus the accelerator may comprise a GPU), it will be appreciated that the data processing system of the technology described herein may comprise any suitable system which is processing protected data. The Applicants have appreciated that such systems may include servers and/or web browsers. For example, in a web browser system, the system may comprise a canvas for arbitrary drawing in web browsers. The canvas may be arranged to allow and image (e.g. containing protected data) to be rendered on it, or it may allow an image to be loaded onto the canvas and then read back to obtain the protected image. (Currently web browsers do not allow images to be read back from a canvas, in order to protect the image data.)

In an embodiment the data processing system also comprises, and/or is in communication with, one or more memories and/or memory devices that store the data described herein, and/or that store software for performing the processes described herein. The data processing system may also be in communication with a host microprocessor, and/or with a display for displaying images based on the data generated by the data processing system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., when desired.

It will also be appreciated by those skilled in the art that all of the described embodiments of the technology described herein can, and in an embodiment do, include, as appropriate, any one or more or all of the optional features described herein.

The methods of the technology described herein may be implemented at least partially using software e.g. computer programs. It will thus be seen that in further embodiments the technology described herein comprises computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor, said graphics processor, renderer or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in another embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of a graphics processing unit processing protected video content in a data processing system.

Like reference numerals are used for like features throughout the drawings where appropriate.

FIG. 1 shows an exemplary embedded data processing system 1 for use, for example in a portable electronic device, such as a mobile phone or tablet. The data processing system includes a host processor (CPU) 2 on which an operating system (OS) 3, one or more applications 4, and a trusted software component 10 (e.g. hypervisor, ARM TrustZone or similar) may execute. The host processor 2 has two operating modes, a "normal", non-secure operating system mode (e.g. Android), and a secure mode where it runs other software, such as ARM TrustZone and/or a hypervisor component outside the non-secure operating system.

The data processing system also includes, in this embodiment, a graphics processing unit (GPU) 5, that can perform graphics processing operations for applications and the operating system executing on the host processor. To facilitate this, the host processor also executes a driver 6 for the graphics processing unit.

As shown in FIG. 1, the graphics processing unit 5 and host processor 2 also have access to memory 7 where the data they are processing may be stored. In the present embodiment, the memory can be configured as protected 8 or non-protected 9 memory regions. The protected memory regions 8 are not readable by the host processor (and thus operating system) when it is operating in a non-secure mode of operation. The protected memory regions 8 may be implemented and configured as desired, for example in the normal manner for the data processing system in question.

Figure 2:
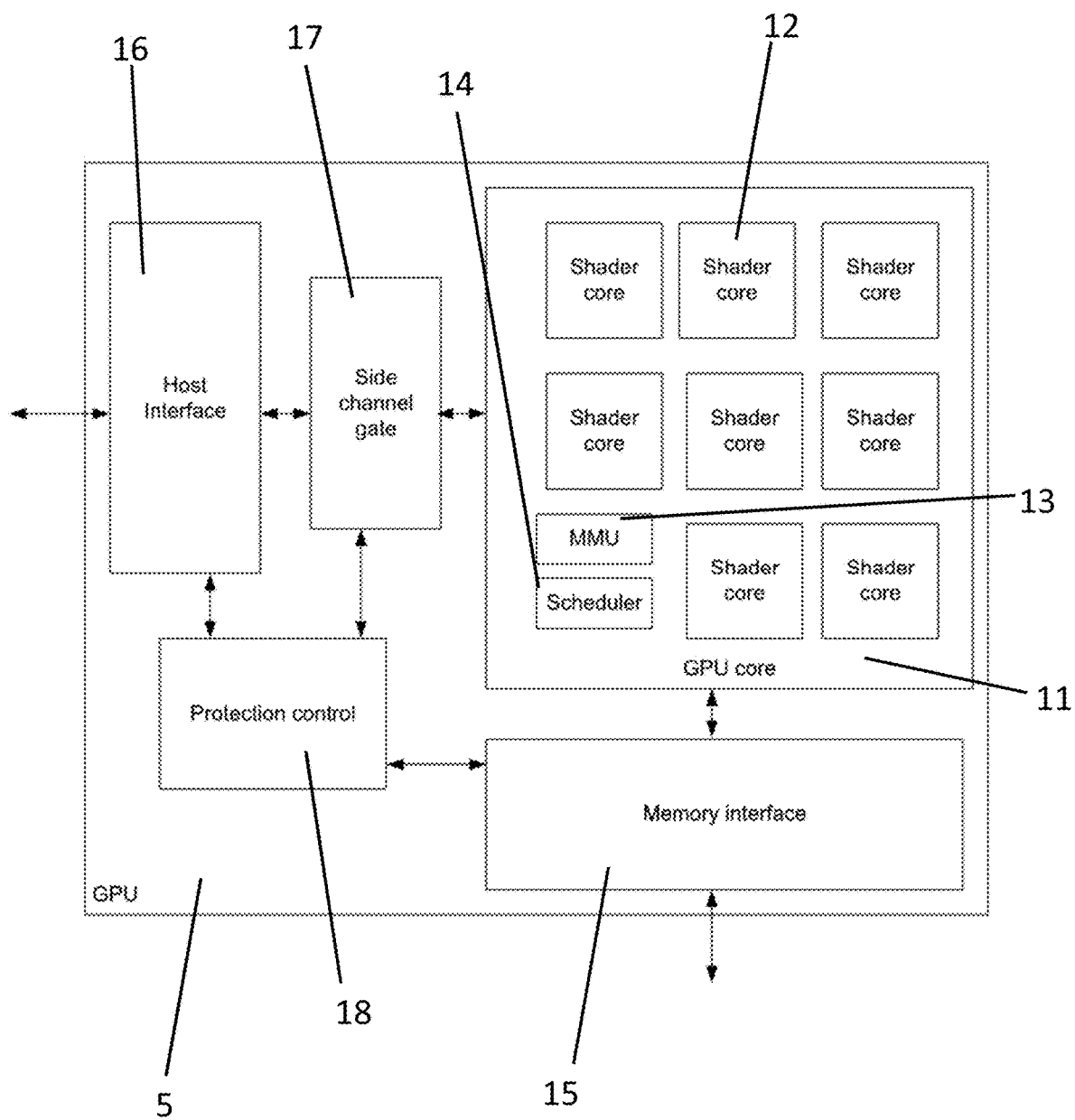
FIG. 2 shows schematically a graphics processing unit that may be included in the data processing system of FIG. 1 in an embodiment of the technology described herein.

FIG. 2 shows schematically an exemplary graphics processing unit (GPU) 5, e.g. for use in the data processing system showing in FIG. 1. The GPU 5 includes a GPU core 11 where the graphics processing operations are performed. The GPU core 11 further includes a number of individual shader cores 12 which are each arranged to run shader programs, e.g. for graphics vertices and fragments being processed by the system, thus allowing multiple shader programs and/or processing threads to be run in parallel. The GPU core 11 also includes a memory management unit (MMU) 13 arranged to handle the memory address virtualisation mapping for the GPU 5, and a scheduler 14 arranged to control the submission of tasks to the shader cores 12.

The GPU 5 also includes a memory interface 15 which enables the GPU 5, including the GPU core 11, to communicate with the memory 7 (as shown in FIG. 1), and a host interface 16 which enables the GPU 5 to communicate with the host processor 2 (as also shown in FIG. 1). Arranged between the host interface 16 and the GPU core 11 is a side channel gate 17 which acts to restrict the transfer of side channel information between the GPU 5 and the host processor 2, and which is controlled by a protection control unit 18, as will be described in more detail below.

Also on the GPU 5 is a "trusted configuration" register 19, e.g. located in the protection control unit 18 and accessible from the host processor 2 through the host interface 16, in which the settings for the side channel information restrictions are stored, to be implemented by the protection control unit 18 when the GPU enters the protected mode of operation.

Figure 3:
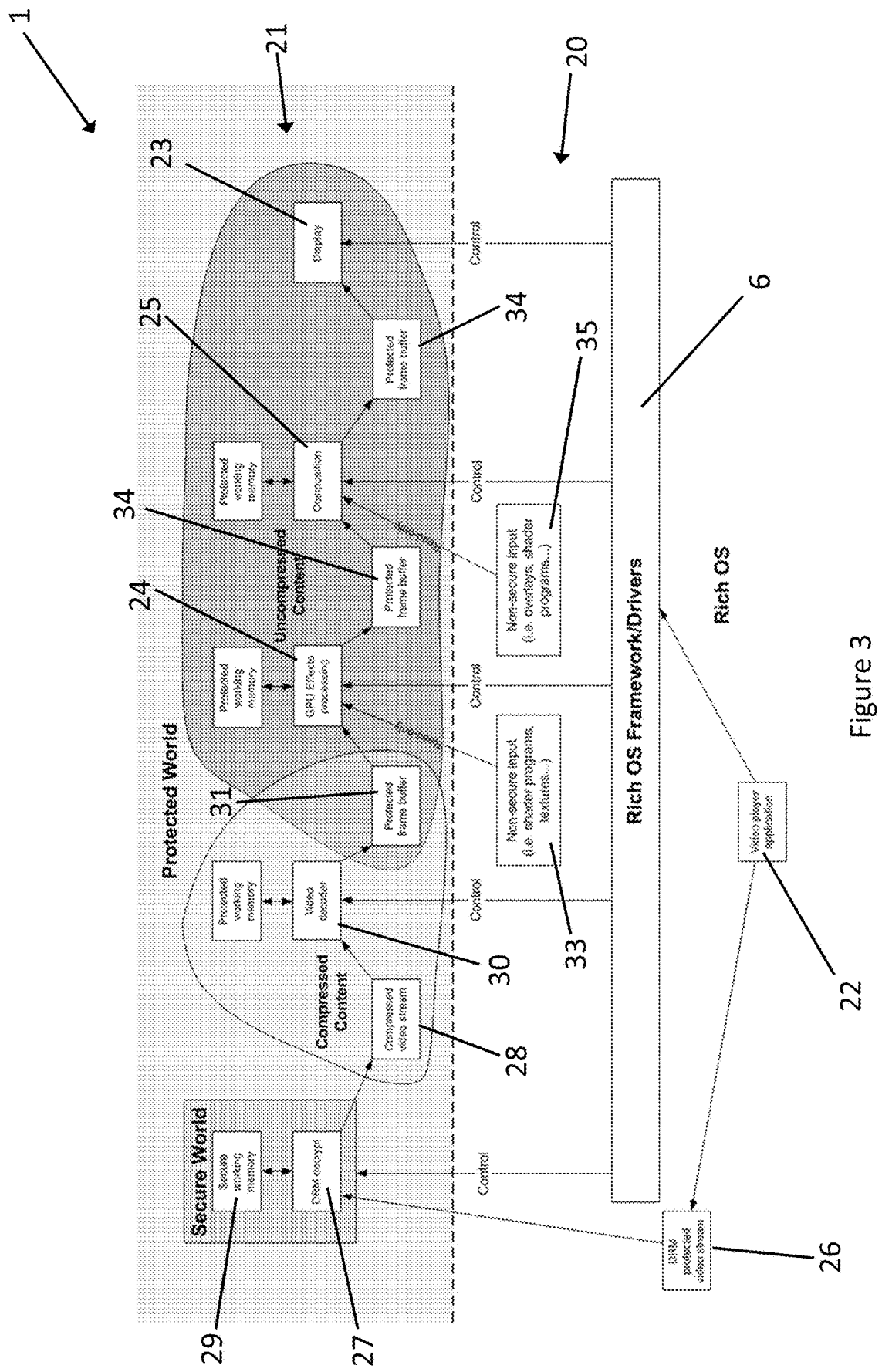
FIG. 3 shows schematically the operation of the data processing system of FIG. 1 and the graphics processing unit of FIG. 2 in an embodiment of the technology described herein.

FIG. 3 shows schematically the various processing operations and memory access arrangements in the system of FIG. 1 when the graphics processing unit 5 of FIG. 2 is being used to process protected data (in this case, protected video content).

As shown in FIG. 3, the data processing system 1 is notionally divided into a normal, non-secure (non-trusted) "world" 20 which is under the control of the operating system 3 on the host processor 2. There is then a corresponding "protected world" 21 where protected processing may be carried out by, for example, an encryption unit, a video decoder and the graphics processing unit 5.

In the arrangement shown in FIG. 3, it is assumed that a video player application 22 executing on the host processor 2 is being used to playback a digital rights management (DRM) protected video stream on a display 23 of the electronic device and that as part of this operation the graphics processing unit 5 will be used to provide some effects processing 24 of the video, and some display composition 25 for the video (e.g. to overlay user interface features over the video when it is displayed).

In order to be able to perform this operation in a protected manner (i.e. without the risk of exposing the DRM protected video content, and any associated side channel information used between the host processor 2 and the GPU 5 in the processing of the DRM protected video content, to the "normal" (non-protected) operating system world 20), the graphics processing unit 5 processes the protected video content in a "protected" operating mode, as will be discussed in more detail below.

To protect the protected video content and the side channel information in the protected mode of operation, the first step in this process is for trusted software (e.g. ARM TrustZone) running on the host processor 2 to set the necessary bits in the "trusted configuration" register 19 in order to indicate to the protection control unit 18 which of the countermeasures for protecting the side channel information are to be implemented when the protected mode is entered.

As well as protecting the leakage of side channel information from the system, the system is also arranged to operate, in embodiments of the technology described herein, to prevent leakage of protected data from the graphics processing unit to the "normal" (non-protected) operating system "world" 20 by protecting the memory which is used in the processing of the protected data.

The first step in this process is to allocate protected memory regions 8 to serve as protected working memory and, e.g., protected frame buffer memory, for the protected video processing operations. This may be done as desired, e.g. as a service of trusted host software executing on the host processor, or the operating system could administrate a pool of protected memory that is allocated at system initialisation. For example, the operating system could allocate parts of the memory to different purposes, and will configure MMU stage 1 mappings for that memory. In the case of using virtualisation-based memory access protection (as is discussed above), the operating system could, e.g., ask trusted host software to move a particular memory area from the normal, non-protected world to the protected world, or vice-versa.

Then data that will be needed for the protected processing (e.g. data that the GPU will modify as part of its protected processing, such as task descriptors) may be copied into the appropriate protected memory regions from the normal, non-protected world, when required. This is done by configuring the host processor 2 into a secure processing mode (e.g. as a service by trusted host software that can then copy the protected data securely into the protected memory regions), or by allowing the operating system (e.g. the GPU driver 6) write-only access to the protected memory areas.

The operating system also stores any non-protected data that will be needed by the graphics processing unit into non-secure (non-protected) memory regions. This data may comprise, for example, shader programs, textures, overlays, etc. that are to be used by the graphics processing unit for its processing, but that do not need to be handled in a protected fashion.

Once the settings in the trusted configuration register have been set and the necessary data has been stored (both in protected and non-protected memory, as appropriate), the graphics processing can be performed. To do this, the graphics processing unit 5 is first switched into a protected mode of operation (this process will be described in more detail below).

The graphics processing unit 5 is signalled that its processing task is to be performed in the protected mode by the driver 6 for the graphics processing unit 5 indicating that when it submits the task to the graphics processing unit 5. The driver 6 determines whether a task for the graphics processing unit 5 is to be performed in the protected mode or not by tracking whether the memory regions to be used for the task are within the protected "world" (protected memory) or not.

The video player application will send the encrypted DRM protected video stream 26 that is to be played back to an appropriate secure encryption unit 27 that is operable to decrypt the encrypted video stream to provide a decrypted video bit stream 28. To do this, the encryption unit 27 may, e.g., have access to appropriate encryption keys stored in secured working memory 29, as is known in the art.

The decrypted video bit stream 28 is then provided to a video decoder 30 that is operating in a protected mode and that then produces decoded frames of video data that it stores in a protected frame buffer 31 (i.e. a protected memory region).

The graphics processing unit 5 then, whilst operating in its protected mode, operates to apply effects to the decoded frames of video data (such as applying textures, etc.), and stores the so-processed frames of video data again in a frame buffer in protected memory 32. This operation is performed under the control of the driver 6 on the host processor 2 for the graphics processing unit 5, and may use, for example, data such as shader programs, textures, etc., that is stored in unprotected memory 33.

The graphics processing unit 5 then performs an appropriate composition operation 25 in its protected mode on the frames from the protected frame buffer 32 and stores the so-processed frames in a protected frame buffer 34 from where the frames can be provided in a secure fashion to a display 23 for display. Again, this operation may use inputs, such as overlays, shader programs, etc. from non-protected memory 35 and is carried out under the control of the driver 6 for the graphics processing unit 5 on the host processor 2.

Once the protected processing task(s) have been completed, the graphics processing unit 5 is switched back to its normal mode of operation.

As described, when processing the protected video content, the graphics processing unit 5 operates in a "protected" mode of operation. In this protected mode of operation, the graphics processing unit 5 is subjected to a number of restrictions on any side channel information which may be produced in the processing of the protected video content as well as memory access restrictions, so as to ensure the security of the protected video content.

A number of embodiments for providing this protected operation will now be described, first with regard to the protected status and control information. In particular, when the graphics processing unit 5 is operating in its protected mode, the side channel information which may be provided by the graphics processing unit 5 and/or the host processor 2 is restricted.

In some embodiments, in order to implement the countermeasures to protect the status and control information, the graphics processing unit 5 reads the trusted configuration register and implements the necessary restrictions based on the bits set in the trusted configuration register. Referring to the embodiment of the graphics processing unit 5 shown in FIG. 2, at least some of these restrictions are implemented by the protection control unit 18, which controls the side channel gate 17 to restrict the transfer of side channel information between the GPU 5 and the host processor 2.

For example, the side channel gate 17 may mask the value of data in a register that is restricted when that register is attempted to be read by the host processor 2 through the host interface 16, e.g. when the registers are located throughout the graphics processing unit 5 rather than being concentrated in the host interface 16. In another example, e.g. when the host interface 16 implements the registers that the host processor 2 can access, the side channel gate 17 may mask the protected data before it is stored in the registers.

In a first embodiment, the side channel information comprises MMU fault information. In this embodiment the MMU fault information which is provided is blocked or restricted to a single bit, e.g. to indicate when the fault is from a tiler or from a shader core 12. This restriction is imposed by the side channel gate 17, which is controlled by the protection control unit 18, when the bit corresponding to the MMU fault information is set in the trusted configuration register. This prevents the full data from the MMU fault information being transferred from the graphics processing unit 5 to the host processor 2, when the graphics processing unit 5 is operating in its protected mode.

In another embodiment the side channel information also or instead comprises information for resuming an interrupted task. In this embodiment the information for resuming an interrupted task which may be provided is masked, e.g. such that the pieces of information for resuming an interrupted task are each read as 0. Again, this restriction is imposed by the side channel gate 17, which is controlled by the protection control unit 18, when the bit corresponding to the information for resuming an interrupted task is set in the trusted configuration register. This prevents the full data from the information for resuming an interrupted task being transferred from the graphics processing unit 5 to the host processor 2, when the graphics processing unit 5 is operating in its protected mode.

In another embodiment the side channel information also or instead comprises data in debug registers. In this embodiment the information which may be provided by the data in the debug registers is masked, e.g. such that the data in the debug registers are each read as 0. Again, this restriction is imposed by the side channel gate 17, which is controlled by the protection control unit 18, when the bit corresponding to the data in the debug registers is set in the trusted configuration register. This prevents the full data from the data in the debug registers being transferred from the graphics processing unit 5 to the host processor 2, when the graphics processing unit 5 is operating in its protected mode.

In another embodiment the side channel information also or instead comprises performance counters. In this embodiment the information which may be provided is restricted by disabling the writing out and/or sampling of the performance counters. Again, this restriction is imposed by the side channel gate 17, which is controlled by the protection control unit 18, when the bit corresponding to the performance counters is set in the trusted configuration register. This prevents the full data from the performance counters being transferred from the graphics processing unit 5 to the host processor 2, when the graphics processing unit 5 is operating in its protected mode.

In another embodiment the side channel information also or instead comprises shader kernel events. In this embodiment the information which may be provided is restricted by disabling the production and/or writing out of shader kernel events. Again, this restriction is imposed by the side channel gate 17, which is controlled by the protection control unit 18, when the bit corresponding to the shader kernel events is set in the trusted configuration register. This prevents the full data from the shader kernel events being transferred from the graphics processing unit 5 to the host processor 2, when the graphics processing unit 5 is operating in its protected mode.

In another embodiment the side channel information also or instead comprises cache timing data. In this embodiment the transactions (e.g. bus transactions) are prevented from monitoring (e.g. snooping) cache lines in the cache of the graphics processing unit 5 and/or the host processor 2. This restriction is implemented by restricting the MMU to treat all memory pages as being non-shared, which is controlled by the protection control unit 18, when the bit corresponding to the cache timing data is set in the trusted configuration register. This prevents the full data from the cache timing data being transferred from the graphics processing unit 5 to the host processor 2, when the graphics processing unit 5 is operating in its protected mode.

In yet another embodiment the side channel information also or instead comprises an accelerator or task status exception or interrupt. In this embodiment the register to which information associated with the exception or interrupt is written is blocked when the accelerator is in the protected mode. Again, this restriction is imposed by the side channel gate 17, which is controlled by the protection control unit 18, when the bit corresponding to the accelerator or task status exception or interrupt is set in the trusted configuration register. This prevents the full data from the accelerator or task status exception or interrupt, e.g. the address associated with a bus error, being transferred from the graphics processing unit 5 to the host processor 2, when the graphics processing unit 5 is operating in its protected mode.

Figure 4:
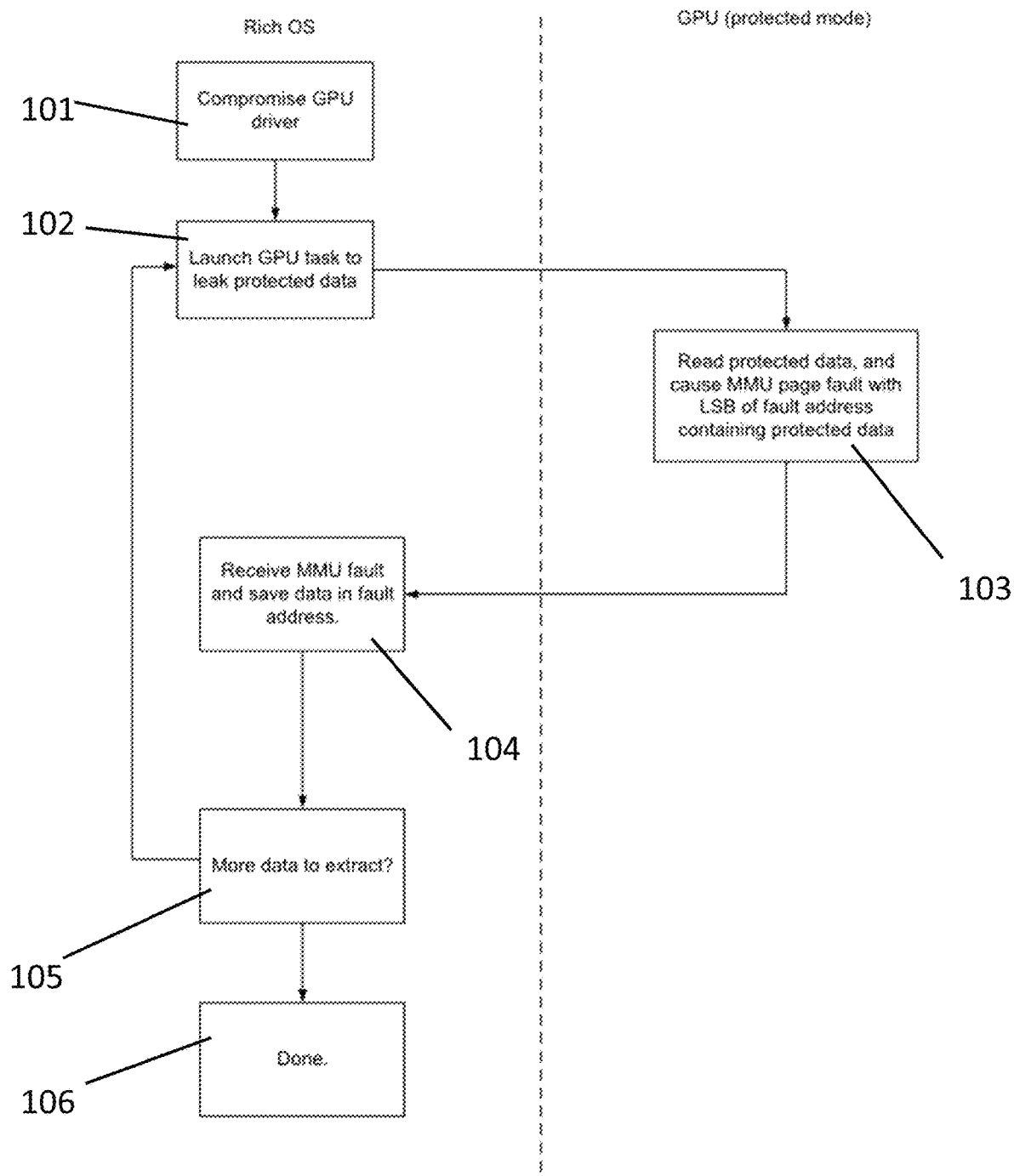
FIG. 4 shows schematically a scenario in which the data processing system of FIG. 1 may be operated in an embodiment of the technology described herein.

FIG. 4 shows schematically a scenario in which the data processing system of FIG. 1 may be operated in an embodiment of the technology described herein. An application (e.g. the video player application 22 shown in FIG. 3) running on the operating system 3, and operating in the normal non-trusted world 20, may try to launch an attack on the graphics processing unit 5 (operating in the trusted world 21) in order to leak protected data from the graphics processing unit 5 back to the operating system.

In order to do this, the application first needs to compromise the driver 6 for the graphics processing unit 5 (step 101, FIG. 4). Once it has done this, the application can submit a task to the graphics processing unit 5 with instructions to leak some of the protected data from the trusted world (step 102, FIG. 4).

One way to achieve this is for the task to read the protected data in the trusted world, e.g. from protected memory region 8, and to cause a MMU page fault, such that the MMU fault address can be selected (step 103, FIG. 4). Ordinarily this would cause the fault address to be revealed and lead to protected data being able to be leaked from the graphics processing unit 5 in the trusted world back to the operating system 3 in the normal world, where it can be saved in the fault address (step 104, FIG. 4).

However, in the protected mode of operation, the information relating to the MMU page fault that can be transferred is restricted to a single bit of information, e.g. from which it may be deduced whether the fault occurred or not. This prevents protected data from leaking through the MMU fault address.

As also shown in FIG. 4, the application performing the attack may repeatedly try to extract protected data from the trusted world (step 105, FIG. 4), until it is finished (step 106, FIG. 4).

A number of embodiments for providing the protected operation of the memory regions will now also be described. In particular, when the graphics processing unit is operating in its normal mode, it has no read access to any protected memory regions, but it is allowed to have write access to protected memory regions (this may be useful, as it allows the graphics processing unit to directly copy data structures required by the GPU into protected memory). In its protected operating mode, the graphics processing unit only has read-only access to non-protected memory (i.e. any memory that can be read by the operating system in a non-secure fashion) (this prevents the GPU from writing any protected data into a memory area accessible by the operating system), and read/write access to the protected memory.

In a first embodiment, a bus transaction filtering mechanism is used to provide the memory access restrictions. In this embodiment, an additional signal is included in the relevant bus transaction signalling (for memory access requests) that indicates when the bus memory access transaction relates to a process that is being carried out in the protected mode or normal mode. This signalling is then detected by a firewall between the graphics processing unit and the memory, which firewall then controls access to the data in memory accordingly. The firewall is configured in advance (in a secure fashion, e.g. by the host processor operating in a secure mode (using trusted software)) to control the memory access in the desired manner.

Figures 5, 6:
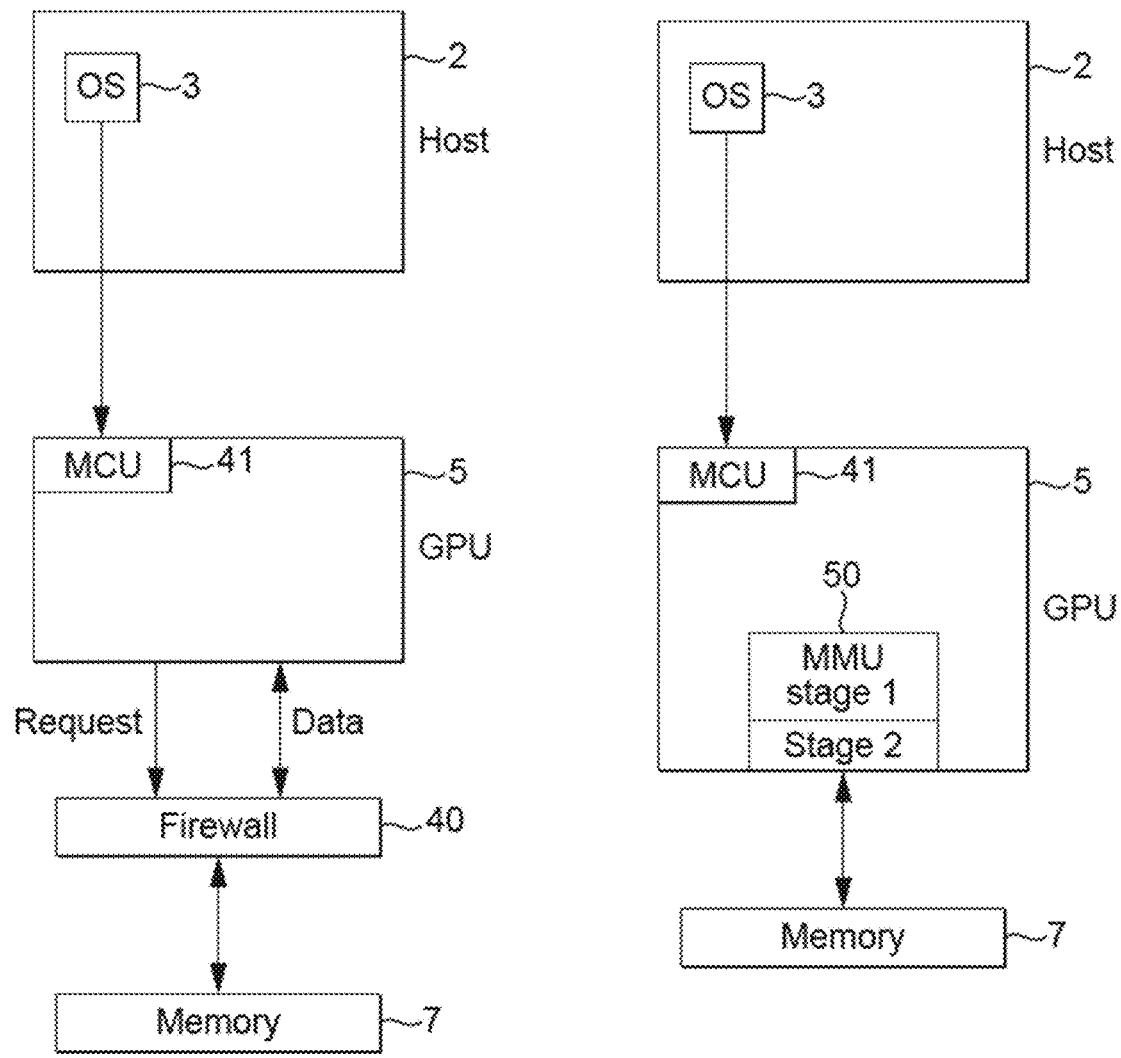
FIGS. 5 and 6 each show schematically an embodiment for providing the memory access restrictions used in the described embodiments of the technology described herein.

FIG. 5 illustrates this arrangement. A firewall 40 is arranged between the graphics processing unit 5 and memory 7. When the graphics processing unit sends a memory transaction request, the firewall 40 determines when it relates to a protected processing task or not, and controls the memory access accordingly.

FIG. 5 also shows a microcontroller 41 associated with the GPU 5 that can be used to configure the GPU to generate protected or non-protected bus transactions, and to configure the firewall 40, as appropriate. (This will be discussed in more detail below.)

In this arrangement, the GPU 5 will accordingly generate normal ("non-protected") bus transactions on its master interfaces during normal processing, and "protected" bus transactions during protected mode processing, and the firewall 40 will then use the protected/non-protected transaction indication to apply the correct memory access permissions.

The firewall can be included in the GPU, or implemented in the SoC, for example in the dynamic memory controller. The firewall operates such that for protected processing bus transactions (i.e. for protected processing memory transactions issued by the GPU) write access is only allowed to protected memory, and for normal processing bus transactions (i.e. for non-protected processing transactions issued by the GPU) read access to protected memory is forbidden.

At all times access (read and write) to truly secure memory (such as a secure CPU runtime for managing DRM keys) from the GPU is blocked.

In another embodiment, the memory access restrictions are achieved through use of memory access virtualisation (i.e. by using appropriate memory address virtualisation mapping in a memory management unit (MMU) of the graphics processing unit).

In this case the stage 2 of the GPU MMU is used for the memory access protection. The MMU stage 2 is managed by trusted host software, such as a hypervisor or other trusted host software arrangement (such as ARM TrustZone). (A hypervisor is, e.g., used when virtualisation (an MMU) is used for memory access protection, whereas another trusted host software arrangement (such as ARM TrustZone) is, e.g., used when bus-based (firewall-based) memory access protection is used.)

FIG. 6 illustrates this arrangement. The GPU 5 has an associated MMU 50 that is used when accessing the memory 7. FIG. 6 also shows an MCU 41 that can be used to configure the MMU context (page table interpretation) to the desired processing mode. (Again, this will be discussed in more detail below.)

In this embodiment, the GPU will use the application MMU stage 1 translation tables (maintained by the operating system) and the operating system MMU stage 2 translation tables (maintained by trusted host software). The protected memory areas are mapped in as write only pages for the normal processing mode in the GPU MMU stage 2.

In this embodiment, the same MMU stage two page tables are used for both normal mode and protected mode operation, but the interpretation of the page table access permissions is varied depending upon which mode (normal or protected) the GPU is operating in.

In one such arrangement, the same bits are used for access permissions for the GPU and CPU, and in protected mode memory areas encoded as read/write for normal mode are interpreted as read-only, and memory areas encoded as write only for normal mode are interpreted as read/write. When the graphics processing unit is operating in its normal (non-protected) mode, the page table permission bits are interpreted in the standard manner.

In another arrangement, the protected memory areas may be encoded by a separate bit in the page table entries, with the access permissions for the second MMU stage then differing between the normal and protected processing mode as follows.

In protected mode, memory areas marked as protected have read/write access (or alternatively read access added, or just no change to access permissions), and areas marked as non-protected have write access removed, or are set to read only. In normal mode, areas marked as protected have read access removed, or no access, or are set to write only access, and areas marked as non-protected are interpreted as usual.

Other arrangements that still achieve the desired memory access restrictions would be possible, when desired.

The memory protection configuration is separate to, and not affected by any GPU reset, and is robust with respect to power management (either not affected by powerdown, or implemented such that no operation is allowed until the configuration has been initialized after powerup). (This is desirable when non-trusted firmware or host software is used for task scheduling.)

As discussed above, in the present embodiment the graphics processing unit is switched from a normal mode of operation to a protected mode of operation and back again.

The switch from normal to protected mode does not require clearing the internal state of the GPU. However, the switch from protected to normal mode ensures that there is no state (e.g. data, etc.) from the protected mode of operation in the graphics processing unit that remains once the graphics processing unit has been switched back to its normal mode (apart from the settings in the trusted configuration register). This helps to ensure that there can be no leakage of data from the protected world to the normal world. Thus, the process of switching the graphics processing unit from its protected mode of operation to its normal mode of operation includes clearing any GPU caches, registers (apart from the trusted configuration register), etc., that store data from the protected operation.

(The GPU caches are also flushed when a memory area changes from protected to normal status, as protected data remaining in the GPU caches could then be flushed into the memory area after the CPU has erased it. Also, when a memory region is changed from being protected to non-protected, it is cleared.)

Although the above embodiments have been described with particular reference to the use of a graphics processor, it will be appreciated that the technology described herein can equally be used for other accelerators (execution units), such as video decoders, etc.

It can be seen from the above that the technology described herein comprises, in some embodiments at least, a mechanism for supporting protected processing of protected data is provided in which an accelerator, such as a graphics processing unit, operates in a protected mode in order to restrict the side channel information provided by the accelerator. This reduces the amount of protected data that can be exposed from a side channel attack on the accelerator when processing protected data.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A data processing system, the data processing system comprising:
   a host processor that executes an operating system; and
   an accelerator operable to process data under the control of the operating system executing on the host processor; wherein:
      the accelerator can be switched between a normal mode of operation and a protected mode of operation in which the accelerator is capable of reducing a size of individual pieces of side channel information related to the processing of the data by the accelerator that can be provided by the accelerator to the host processor to a non-zero reduced size of individual pieces of side channel information,
      wherein in the protected mode of operation, the accelerator is capable of restricting the side channel information by reducing the size of individual pieces of side channel information that can be provided by the accelerator to the host processor to a non-zero reduced size of individual pieces of side channel information compared to the size of individual pieces of side channel information that can be provided in the normal mode of operation by the accelerator to the host processor; and
      the data processing system further comprises a mechanism for switching the accelerator from its normal mode of operation to the protected mode of operation, and from its protected mode of operation to the normal mode of operation.

2. The system of claim 1, wherein the accelerator comprises a graphics processing unit.

3. The system of claim 1, wherein the system comprises one or more registers and the side channel information is written into the one or more registers, and the side channel information that can be provided by the accelerator is restricted by masking the side channel information in the register.

4. The system of claim 1, wherein the system comprises a memory and the side channel information is stored in the memory, and the side channel information that can be provided by the accelerator is restricted by setting the side channel information to a dummy or default value in the memory.

5. The system of claim 1, wherein the data processing system comprises one or more communication links between the accelerator and the host processor, wherein in the protected mode of operation the side channel information that can be transferred by the accelerator to the host processor is restricted.

6. The system of claim 1, wherein the side channel information comprises one or more of: memory management unit fault information, information relating to the status of a task or a group of tasks, information relating to debugging, performance counters, information for communicating between the shader kernel and the host processor, information relating to the completion status of a task or a group of tasks, accelerator fault addresses, cache timing data, an exception, and an interrupt.

7. The system of claim 1, wherein the restriction on the side channel information is enabled by setting a configuration of a trusted register.

8. The system of claim 1, wherein the mechanism for switching the accelerator from its normal mode of operation to the protected mode of operation, and from its protected mode of operation to the normal mode of operation comprises one of: using trusted firmware to control the switching; using open firmware in conjunction with trusted host software for the switching; fully through trusted software; or using a trusted hardware implemented mechanism.

9. The system of claim 1, wherein the data processing system further comprises:
   a memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode; wherein:
      when the accelerator is in the normal mode of operation the accelerator has read and write access to data that is stored in non-protected memory regions but no or write-only access to any protected memory regions; and
      when the accelerator is in the protected mode of operation the accelerator has read and write access to data that is stored in protected memory regions but only has read-only access to any non-protected memory regions.

10. A method of operating a data processing system that comprises:
    a host processor that executes an operating system; and
    an accelerator operable to process data under the control of the operating system executing on the host processor; wherein:
       the accelerator can be switched between a normal mode of operation and a protected mode of operation in which the accelerator is capable of reducing a size of individual pieces of side channel information related to the processing of the data by the accelerator that can be provided by the accelerator to the host processor to a non-zero reduced size of individual pieces of side channel information; and
    the method comprising:
    when it is desired to use the accelerator to perform processing of protected data:
       switching the accelerator to its protected mode of operation;
       while the accelerator is operating in its protected mode of operation restricting the side channel information that can be provided by the accelerator to the host processor by reducing the size of individual pieces of side channel information that can be provided by the accelerator to the host processor to a non-zero reduced size of individual pieces of side channel information compared to the size of individual pieces of side channel information that is able to be provided by the accelerator to the host processor in the normal mode of operation; and when the accelerator has completed its protected processing task, switching the accelerator back to its normal mode of operation.

11. The method of claim 10, wherein the accelerator comprises a graphics processing unit.

12. The method of claim 10, wherein the side channel information is written into one or more registers, and the method comprises restricting the side channel information that can be provided by the accelerator by masking the side channel information in the register.

13. The method of claim 10, wherein the side channel information is stored in a memory, and the method comprises restricting the side channel information that can be provided by the accelerator by setting the side channel information to a dummy or default value in the memory.

14. The method of claim 10, wherein the data processing system comprises one or more communication links between the accelerator and the host processor, and the method comprises: in the protected mode of operation, restricting the side channel information that can be transferred by the accelerator to the host processor.

15. The method of claim 10, wherein the side channel information comprises one or more of: memory management unit fault information, information relating to the status of a task or a group of tasks, information relating to debugging, performance counters, information for communicating between the shader kernel and the host processor, information relating to the completion status of a task or a group of tasks, accelerator fault addresses, cache timing data, an exception, and an interrupt.

16. The method of claim 10, wherein the method further comprises enabling the restriction on the side channel information by setting a configuration of a trusted register.

17. The method of claim 10 wherein the mechanism for switching the accelerator from its normal mode of operation to the protected mode of operation, and from its protected mode of operation to the normal mode of operation comprises one of: using trusted firmware to control the switching; using open firmware in conjunction with trusted host software for the switching; fully through trusted software; or using a trusted hardware implemented mechanism.

18. The method of claim 10, wherein the data processing system further comprises:
a memory for storing data to be used or processed by or generated by the accelerator, the memory being configurable to have both protected memory regions that are not readable by the operating system when it is operating in a non-secure mode and non-protected memory regions that are readable by the operating system when it is operating in a non-secure mode; and
the method further comprises:
the accelerator, whilst it is operating in its protected mode of operation, reading data from and writing data to the protected regions of the memory, and reading data from, but not writing data to, the non-protected regions of the memory.

19. A non-transient computer readable storage medium storing computer software code which when executing on a data processing system performs a method of operating a data processing system that comprises:
a host processor that executes an operating system; and
an accelerator operable to process data under the control of the operating system executing on the host processor; wherein:
the accelerator can be switched between a normal mode of operation and a protected mode of operation in which the accelerator is capable of reducing a size of individual pieces of side channel information related to the processing of the data by the accelerator that can be provided by the accelerator to the host processor to a non-zero reduced size of individual pieces of side channel information; and
the method comprising:
when it is desired to use the accelerator to perform processing of protected data:
switching the accelerator to its protected mode of operation;
while the accelerator is operating in its protected mode of operation restricting the side channel information that can be provided by the accelerator to the host processor by reducing the size of individual pieces of side channel information that can be provided by the accelerator to the host processor to a non-zero reduced size of individual pieces of side channel information compared to the size of individual pieces of side channel information that is able to be provided by the accelerator to the host processor in the normal mode of operation; and
when the accelerator has completed its protected processing task, switching the accelerator back to its normal mode of operation.

* * * * *